(12) United States Patent
Matsuyama et al.

(10) Patent No.: US 7,762,375 B2
(45) Date of Patent: Jul. 27, 2010

(54) SOUNDPROOFING MATERIAL

(75) Inventors: Sohei Matsuyama, Aichi-ken (JP); Michio Takeda, Nagoya (JP); Shigeki Takamido, Ichinomiya (JP); Rui Tokida, Kitanagoya (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 0 days.

(21) Appl. No.: 12/364,646

(22) Filed: Feb. 3, 2009

(65) Prior Publication Data

US 2009/0255755 A1    Oct. 15, 2009

(30) Foreign Application Priority Data

Apr. 9, 2008    (JP) ............... 2008-101904

(51) Int. Cl.
*E04B 1/82*    (2006.01)

(52) U.S. Cl. .................. 181/290; 181/286; 181/295

(58) Field of Classification Search ........... 181/290, 181/286, 295
See application file for complete search history.

(56) References Cited

U.S. PATENT DOCUMENTS

| | | | | |
|---|---|---|---|---|
| 3,182,747 A | * | 5/1965 | Wilhelmi et al. | 181/286 |
| 4,057,123 A | * | 11/1977 | Erickson | 181/286 |
| 4,883,143 A | * | 11/1989 | Lagier | 181/286 |
| 5,512,715 A | * | 4/1996 | Takewa et al. | 181/295 |
| 5,587,564 A | * | 12/1996 | Stief et al. | 181/295 |
| 5,661,273 A | * | 8/1997 | Bergiadis | 181/290 |
| 5,681,072 A | * | 10/1997 | Stricker | 296/39.3 |
| 5,800,888 A | * | 9/1998 | Yasumoto et al. | 428/36.91 |
| 5,851,626 A | * | 12/1998 | McCorry et al. | 428/95 |
| 6,015,026 A | * | 1/2000 | McGrath | 181/295 |

(Continued)

FOREIGN PATENT DOCUMENTS

JP    2004-237452 A    8/2004

(Continued)

OTHER PUBLICATIONS

English language Abstract and translation of JP 2004-237452 A.

(Continued)

*Primary Examiner*—Jeffrey Donels
*Assistant Examiner*—Christina Russell
(74) *Attorney, Agent, or Firm*—Greenblum & Bernstein, P.L.C.

(57) ABSTRACT

The object of the present invention is to provide a soundproofing material that is lightweight and has sufficient soundproofing performance. The present soundproofing material includes a frame body including a planar portion and a wall body installed upright on the planar portion and a soundproofing laminate accommodated in a laminate accommodating portion surrounded by the wall body, and the soundproofing laminate has a hard layer consisting of a rubber sheet or the like and a soft layer whose one side of the soft layer is laminated on the hard layer and consists of a felt, a resin foam or the like, and another side of the soft layer is joined to at least one of the planar portion and/or the wall body of the frame body, and a side surface of the soundproofing laminate and a side surface of the wall body are distant from each other. The distance thereof is preferably in the range from 0.3 to 1 mm.

10 Claims, 4 Drawing Sheets

U.S. PATENT DOCUMENTS

| | | | |
|---|---|---|---|
| 6,119,807 A * | 9/2000 | Benson et al. | 181/208 |
| 7,080,712 B2 | 7/2006 | Tsuiki et al. | |
| 7,249,662 B2 * | 7/2007 | Itou | 188/377 |
| 2004/0069564 A1 * | 4/2004 | Wang et al. | 181/293 |
| 2005/0217933 A1 * | 10/2005 | Sung Young et al. | 181/290 |
| 2005/0263345 A1 * | 12/2005 | Erickson et al. | 181/290 |
| 2006/0289229 A1 * | 12/2006 | Yamaguchi | 181/290 |
| 2007/0272482 A1 * | 11/2007 | Yamaguchi et al. | 181/290 |
| 2008/0116006 A1 * | 5/2008 | Doneux et al. | 181/286 |

FOREIGN PATENT DOCUMENTS

| | | |
|---|---|---|
| JP | 2005-145383 A | 6/2005 |

OTHER PUBLICATIONS

English language Abstract and translation of JP 2005-145383 A.

* cited by examiner

F I G. 1
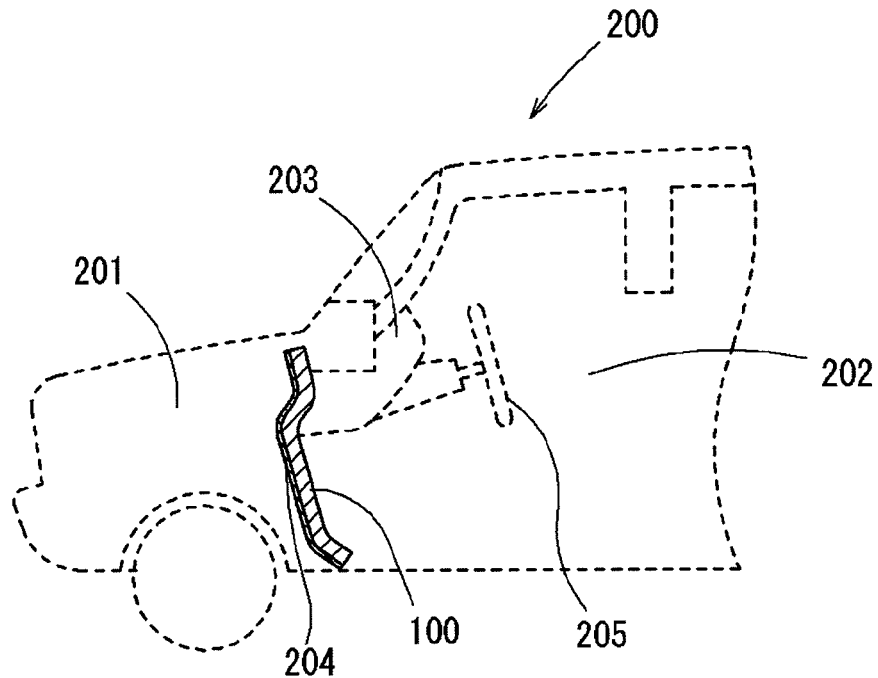
F I G. 2
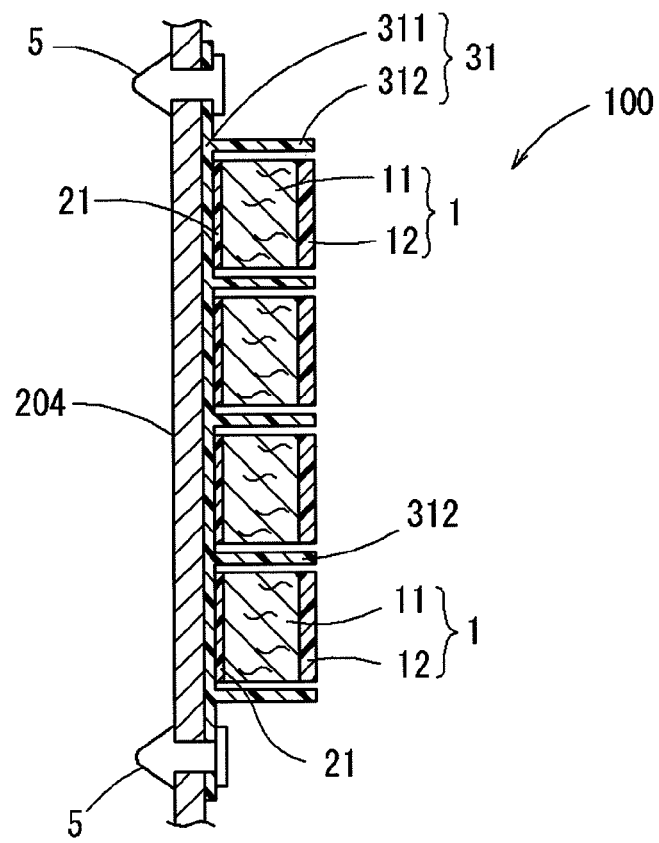

SOUNDPROOFING MATERIAL

INCORPORATION BY REFERENCE

The disclosure of Japanese Patent Application No. 2008-101904 filed on Apr. 9, 2008 including the specification, drawings and abstract is incorporated herein by reference in its entirety.

BACKGROUND OF THE INVENTION

1. Field of the Invention

The present invention relates to a soundproofing material. More specifically, the present invention relates to a soundproofing material which does not have a problem such as a reduction in area contributing to soundproofing as a result of an end portion and a periphery of a through hole for inserting various members being crushed and which is lightweight and has sufficient soundproofing performance.

2. Related Art

A sheet formed of an ethylene propylene diene rubber (EPDM) or the like has been conventionally used as a soundproofing material such as a dash silencer shown in FIG. 1 and a floor silencer for a vehicle. Although the sheet sufficiently functions as a sound isolating material, there has been a problem regarding weight. In addition, a soundproofing material has been known in which a soft material (corresponding to a spring) having low density and high air permeability and a hard material (corresponding to a mass) having high density and low air permeability are laminated to isolate and absorb sound generated from a vehicle body panel using a vibration-proof region of spring-mass resonance. This soundproofing material is lightweight and has excellent soundproofing performance.

Further, Japanese Unexamined Patent Application Publication No. 2004-237452 and the like disclose a composite member with noise preventing and impact absorbing performances in which one surface is closed, another surface is opened, and a fiber material with a specific thickness is compounded and installed on the open surface side of a plate-shaped molded honeycomb foam having a specific density. Additionally, Japanese Unexamined Patent Application Publication No. 2005-145383 and the lie disclose a vehicular interior member that has a specific structure and includes: an impact absorbing member having a plurality of openings penetrating to the back side and having a plurality of ribs on the back side; and a sound absorbing member formed of a material capable of absorbing noise and attached to the impact absorbing member from the back side.

In the above-mentioned soundproofing material in which the soft material and the hard material are laminated to isolate and absorb sound using a spring-mass effect, a stud bolt 4 installed in a vehicle body panel 204 is generally inserted to an attachment hole provided in the soundproofing material and fixed with a clip 5 at a vertical wall surface of a vehicle body, for example (see FIG. 9). In this case, the periphery of the attachment hole and an end portion of the soundproofing material are crushed to form a crushed portion 1' in order to reduce leakage of sound from an end surface. However, when a felt or the like used as the soft material is crushed, there has been a problem that the proportion of area capable of exhibiting sufficient performance as the spring decreases, causing a decrease in the soundproofing performance. In addition, since the fiber material corresponding to the mass is fixed and does not vibrate in the case where the spring-mass effect is assumed in the composite member disclosed in Japanese Unexamined Patent Application Publication No. 2004-237452, the noise cannot be sufficiently blocked and absorbed. Further, since the vehicular interior member disclosed in Japanese Unexamined Patent Application Publication No. 2005-145383 does not have a member corresponding to the mass, the soundproofing member corresponding to the spring is fixed and does not vibrate, the noise cannot be sufficiently blocked and absorbed.

SUMMARY OF THE INVENTION

It is an object of the present invention to provide a soundproofing material which does not have a problem such as a reduction in area contributing to soundproofing as a result of a peripheral end portion, a periphery of a through hole for inserting various members, a periphery of an attachment hole for attaching the various members to a vehicle body panel and the like being crushed and which is lightweight and has sufficient soundproofing performance.

The present invention is as follows.

1. A soundproofing material comprising a frame body and a soundproofing laminate accommodated in a laminate accommodating portion surrounded by a wall body forming the frame body, wherein the soundproofing laminate includes a hard layer and a soft layer in which one side (hereinafter, referred to also as "the first surface side") of the soft layer is laminated on the hard layer, wherein a periphery of another side (hereinafter, referred to also as "the second surface side") of the soft layer is joined to the wall body, and wherein a side surface of the soundproofing laminate and a side surface of the wall body are distant from each other.

Hereinafter, this soundproofing material is referred to as "the first embodiment of the soundproofing material according to the present invention".

2. The soundproofing material according to 1 above, wherein the wall body is provided up to at least a height of an upper end surface on the first surface side of the soft layer.
3. The soundproofing material according to 1 or 2 above, wherein a planar shape of the frame body is a lattice shape.
4. The soundproofing material according to any one of 1 to 3 above which is used for soundproofing in a vehicle, wherein the hard layer is arranged on a vehicle interior side.
5. A soundproofing material comprising a frame body including a planar portion and a wall body installed upright on the planar portion and a soundproofing laminate accommodated in a laminate accommodating portion surrounded by the wall body, wherein the soundproofing laminate includes a hard layer and a soft layer in which one side (first surface side) of the soft layer is laminated on the hard layer, wherein another side (second surface side) of the soft layer is joined to at least one of the planar portion and the wall body of the frame body, and wherein a side surface of the soundproofing laminate and a side surface of the wall body are distant from each other.

Hereinafter, this soundproofing material is referred to as "the second embodiment of the soundproofing material according to the present invention".

6. The soundproofing material according to 5 above, wherein the wall body is provided up to at least a height of an upper end surface on the one side (first surface side) of the soft layer.
7. The soundproofing material according to 5 or 6 above, wherein a planar shape of the frame body is a lattice shape.
8. The soundproofing material according to any one of 5 to 7 above which is used for soundproofing in a vehicle, wherein the hard layer is arranged on a vehicle interior side.

In the first embodiment of the soundproofing material according to the present invention which has a frame body and a soundproofing laminate accommodated in a laminate accommodating portion surrounded by a wall body forming the frame body, and the second embodiment of the soundproofing material according to the present invention which has a frame body including a planar portion and a wall body, and a soundproofing laminate accommodated in a laminate accommodating portion surrounded by the wall body, the soundproofing laminate is accommodated in the laminate accommodating portion of the frame body in both case. Therefore, it is only necessary to fix the frame body to a vehicle body panel or the like in the case of attaching the soundproofing material to the vehicle body panel or the like, and an end portion of the soundproofing material does not need to be crushed. Additionally, when a member such as a steering shaft is inserted, the soundproofing material does not need to be crushed at the periphery of the through hole. Thus, the soundproofing material does not have a problem such as a reduction in area contributing to soundproofing and is lightweight and has sufficient soundproofing performance. Further, noise can be blocked and absorbed easily and sufficiently to exhibit an excellent soundproofing performance since a periphery of the second surface side of the soft layer is joined to the frame body and a side surface of the soundproofing laminate and a side surface of the wall body are distant from each other.

In the case where the wall body is provided at least up to the height of the upper end surface on the first surface side of the soft layer, leaked sound from a side surface of the soft layer is reflected by the wall body to reenter the soft layer. Therefore, the sound is sufficiently absorbed by the soft layer, and the soundproofing material having further excellent soundproofing performance can be achieved.

Further, in the case where the planar shape of the frame body is a lattice shape, the soundproofing material can exhibit excellent soundproofing performance as well as sufficiently function as an energy absorbing material. When the soundproofing material is attached to a pillar, roof side rail and the like of a vehicle in particular, a head injury value at the time of a collision can be effectively reduced and noise from the pillar, roof side rail and the like and the vicinity thereof can be sufficiently suppressed. Thus, the soundproofing material has excellent soundproofing performance for a vehicle.

In the case where the soundproofing material is used for soundproofing in a vehicle and the hard layer is arranged so as to face a vehicle interior side, noise from a sound source is absorbed by the soft layer and blocked by the hard layer. Therefore, the soundproofing material having excellent soundproofing performance to sufficiently reduce noise transmitted to an occupant.

BRIEF DESCRIPTION OF THE DRAWINGS

FIG. 1 is a schematic cross-sectional view of a dash silencer arranged between an engine room and a vehicle interior of an automobile.

FIG. 2 is a schematic cross-sectional view of a vehicle body panel and a soundproofing material that is formed by joining a soundproofing laminate to a frame body having a planar portion and a wall body and is attached to the vehicle body panel with a clip.

EXPLANATION OF THE REFERENCE NUMBERS

200: automobile, 201: engine room, 202: vehicle interior, 203: dashboard, 204: vehicle body panel, 205: steering wheel, 100, 101, 102, 103 & 104: soundproofing material, 1: soundproofing laminate, 11: soft layer, 111: one side (first surface side) of the soft layer, 111a: upper end surface, 112: another side (second surface side) of the soft layer, 12: hard layer, 1': crushed portion, 21: adhesion layer, 22: adhesion portion, 31: lattice-like frame body, 31a: laminate accommodating portion, 31b: opening portion, 4: stud bolt, 5: clip.

DETAILED DESCRIPTION OF THE PREFERRED EMBODIMENTS

Hereinafter, the present invention will be described in detail with reference to the drawings.

The first embodiment of a soundproofing material according to the present invention includes a frame body and a soundproofing laminate accommodated in a laminate accommodating portion surrounded by a wall body forming the frame body, the soundproofing laminate includes a hard layer and a soft layer in which one side (first surface side) of the soft layer is laminated on the hard layer, a periphery of another side (second surface side) of the soft layer is joined to the wall body, and a side surface of the soundproofing laminate and a side surface of the wall body are distant from each other.

Additionally, the second embodiment of a soundproofing material according to the present invention is similar in configuration to the first embodiment of the soundproofing material according to the present invention, except that a frame body has a planar portion and a wall body installed upright on the planar portion and at least a periphery of the second surface side of the soft layer is joined to at least one of the planar portion and the wall body.

Figure 3:
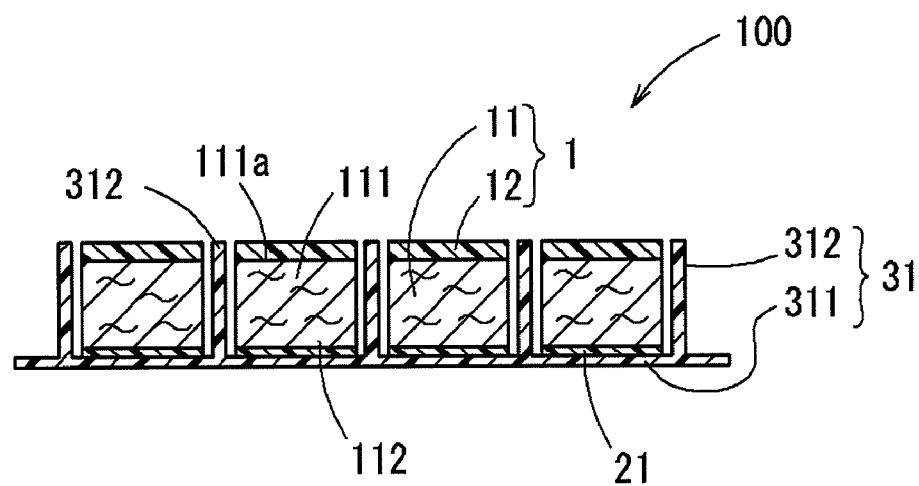
FIG. 3 is a schematic cross-sectional view of a frame body having a planar portion and a wall body installed upright on the planar portion, and a soundproofing laminate joined to the planar portion.
Figure 4:
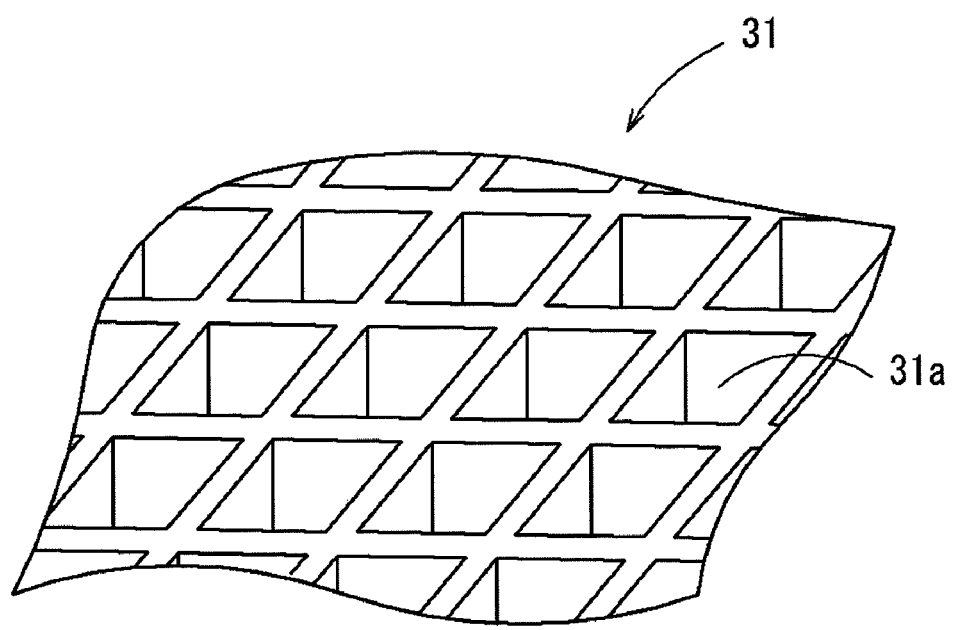
FIG. 4 is a schematic perspective view of a frame body in which the planar shape is a lattice shape.
Figure 5:
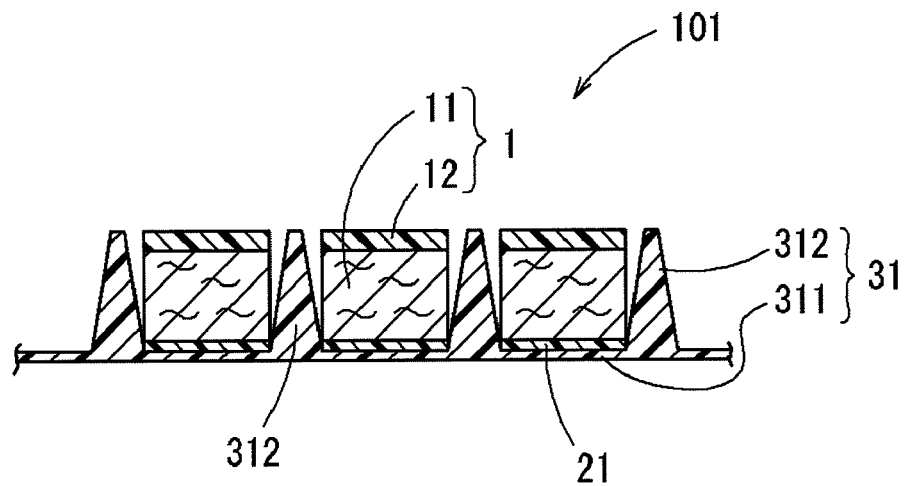
FIG. 5 is a schematic cross-sectional view of a soundproofing material in which the wall body is made narrower in width from the second surface side of a soft layer toward a hard layer side.
Figure 8:
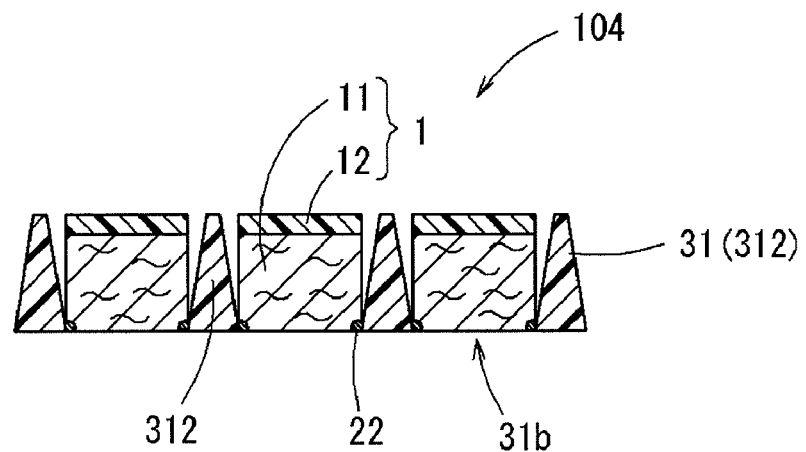
FIG. 8 is a schematic cross-sectional view of a soundproofing material which includes a frame body without a planar portion and in which only the periphery on the second surface side of a soft layer is joined to a wall body.
Figure 9:
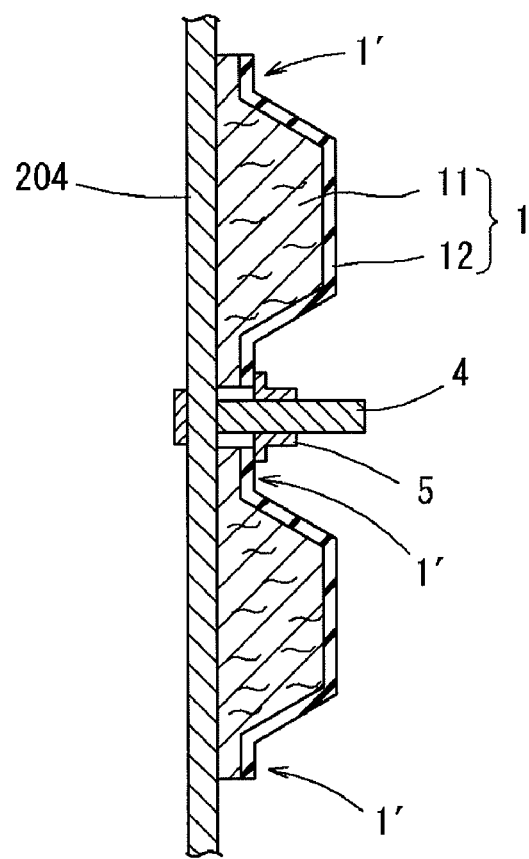
FIG. 9 is a schematic explanatory view of a conventional soundproofing material which is attached to a vehicle body panel with a stud bolt attached to the vehicle body panel and a clip and in which a crushed portion is formed at a periphery of the stud bolt and an end portion being crushed.

A "frame body 31" shown in FIG. 4 is formed of a "wall body 312" in FIG. 8 in the first embodiment of the soundproofing material according to the present invention. That is, the frame body 31 is formed only of the wall body 312, and a "laminate accommodating portion 31a" in FIG. 4 formed by being surrounded by the wall body 312 is a through hole open on both surfaces of the frame body 31 in the thickness direction (see opening portion 31b in FIG. 8). In the second embodiment of a soundproofing material according to the present invention, on the other hand, the frame body 31 is formed of a "planar portion 311" and a "wall body 312" installed upright on the planar portion 311 (see FIG. 3 and the like), and the laminate accommodating portion 31a in FIG. 4 formed by being surrounded by the planar portion 311 and the wall body 312 is open on the first surface side of the frame body 31 in the thickness direction and is closed by the planar portion 311 to form a recess portion on the second surface side (see FIG. 3 and FIGS. 5 to 7).

The sectional shapes in the planar direction of the laminate accommodating portion formed by the wall body and the laminate accommodating portion formed by the planar portion and the wall body are not particularly limited. The sectional shape may be a polygon such as a square, a rectangle, a triangle, a pentagon and a hexagon, a circle, an ellipse, an oval, or the like. A square or a rectangle is preferable, and the square is more preferable. The shape of a vertical section of the laminate accommodating portion may be a square or a rectangle. That is, the wall body is provided approximately in the same direction as the thickness direction of the frame body. (The phrase "approximately in the same direction" means that the thickness direction of the frame body and the vertical direction of the wall body form an angle of 85° to 95°, preferably 90°.)

The width of the wall body 312 may be constant from the second surface side 112 of a soft layer 11 to a hard layer 12 side (see FIGS. 2 and 3) or may be made narrower from the second surface side 112 of the soft layer 11 toward the hard layer 12 side, but is preferably made narrower toward the hard layer 12 side (see FIGS. 5 to 8). In other words, the laminate accommodating portion 31a (see FIG. 4) is preferably made wider toward the hard layer 12 side. With the wall body 312 as described above, a contact between a soundproofing laminate 1 and the wall body 312 can be reliably prevented to provide a soundproofing material with a further excellent soundproofing performance.

Note that in the case where the width of the wall body is made narrower toward the hard layer 12 side, the shape of the vertical section of the laminate accommodating portion is a trapezoid in which the base is on the hard layer 12 side.

Figure 6:
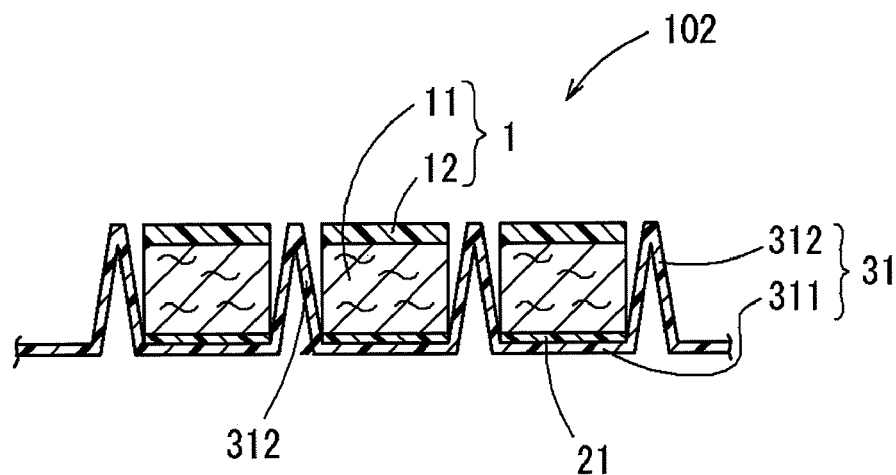
FIG. 6 is a schematic cross-sectional view of a soundproofing material in which the wall body is made narrower in width from the second surface side of a soft layer toward a hard layer side and in which the wall body is not a solid body.
Figure 7:
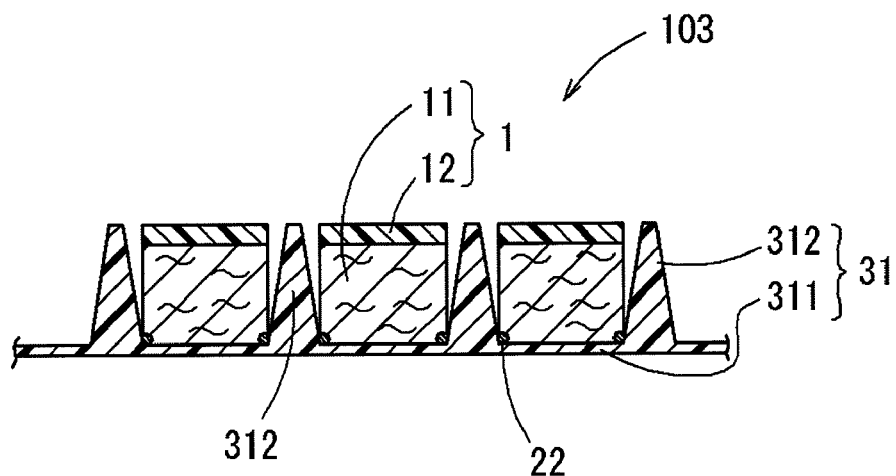
FIG. 7 is a schematic cross-sectional view of the soundproofing material in FIG. 5 in which only a periphery on the second surface side of a soft layer is joined to a planar portion and a wall body of the frame body.

Further, the wall body 312 may be a solid body when seen in a vertical section, or may be a non-solid body including an unfilled portion (see FIG. 6). Alternatively, the wall body 312 may be made into a hollow body depending on a molding method. A solid body is advantageous in terms of strength, and a non-solid body is advantageous in terms of weight reduction.

The number of laminate accommodating portions included in the frame body is not also particularly limited, and may be an appropriate number depending on the structure or the like of a part for which the soundproofing material is used. For example, the frame body may have a number of laminate accommodating portions. In this case, the sectional shape of each of the laminate accommodating portion in the planar direction is not particularly limited, but is preferably a square or a rectangle, the square being more preferable. That is, the planar shape of the frame body is preferably a lattice shape. The frame body also functions as an energy absorbing material. The frame body in lattice shape particularly has an excellent energy absorbing performance, and is preferable in this term as well.

The space for the laminate accommodating portion formed by the wall body and the space for the laminate accommodating portion formed by the planar portion and the wall body do not need to be entirely the laminate accommodating portion, and may partly be a through hole for inserting various members. For example, when the soundproofing material is a dash silencer of a vehicle, a through hole for inserting a steering shaft, a duct, a harness, a heater hose, an air conditioner pipe or the like may be provided. In this case, the configuration may be such that the wall body is formed in the circumference of the through hole and an outer periphery of the soundproofing material and the soundproofing laminate is accommodated in a portion other than the through hole.

It is preferable that the through hole for inserting a member be provided in a predetermined part in a predetermined number, and that the shape and dimension of the cross section of the through hole be appropriately set depending on the shape and dimension of the cross section of the member to be inserted. Further, since noise enters from a gap between an inner wall surface of the through hole and an outer surface of the member when the through hole is provided, the gap is preferably made as small as possible.

The dimension of the frame body is not also particularly limited, and may be an appropriate dimension depending on the structure or the like of a part for which the soundproofing material is used. The dimension of the wall body is not also particularly limited, but the dimension in the vertical direction (height) of the wall body is preferably in the range from 5 to 100 mm and more preferably from 10 to 50 mm in the frame body of the first embodiment of a soundproofing material according to the present invention. In addition, the width is preferably in the range from 0.5 to 5 mm and more preferably from 1 to 3 mm. Further, in the case where the wall body 312 is made narrower toward the hard layer 12 side, the width of the wall body 312 is preferably in the range from 0.5 to 5 mm and more preferably from 1 to 3 mm on the second surface side 112 of the soft layer 11. The width is preferably in the range from 0.5 to 3 mm and more preferably from 1 to 1.5 mm on the first surface side 111 (side of the hard layer 12) of the soft layer 11 (see FIG. 3).

The dimension of the laminate accommodating portion in the planar direction is not also particularly limited. In the case where the frame body has a number of the laminate accommodating portions and the sectional shape of the laminate accommodating portion in the planar direction is a square, the dimension of one side of the soft layer on the second surface side is preferably in the range from 30 to 200 mm and more preferably from 50 to 150 mm. When the sectional shape of the laminate accommodating portion in the planar direction is a shape other than the square, the dimension is preferably such that the area of the laminate accommodating portion is equivalent to that in the case where the sectional shape in the planar direction is the square described above.

When the number of the laminate accommodating portions is small, the dimension of the laminate accommodating portion may be made appropriate depending on the entire area of the soundproofing material.

In the second embodiment of the soundproofing material according to the present invention, the preferable dimensions of the wall body and the laminate accommodating portion are respectively similar to those in the first embodiment of the soundproofing material according to the present invention, and the thickness of the planar portion is preferably in the range from 0.5 to 5 mm and more preferably from 1 to 3 mm.

The material of the frame body is not also particularly limited, and various synthetic resins may be used. Examples of the synthetic resin include a polyester resin such as polyethylene terephthalate and polybutylene terephthalate, a polyamide resin such as nylon 6 and nylon 66, a polyolefin resin such as polyethylene and polypropylene, an acrylic resin such as poly methyl methacrylate, and the like. The frame body can be molded by injection molding method or the like using these synthetic resins. Of the synthetic resins, polypropylene, polyethylene or the like is preferable in terms of environment resistance and energy absorbing performance.

The "soundproofing laminate 1" has the "hard layer 12" and the "soft layer 11" in which the first surface side 111 of the soft layer is laminated with respect to the hard layer 12 (see FIG. 3 and the like). The soft layer 11 is lower in density and higher in air permeability compared to the hard layer 12. That is, the soft layer corresponds to a spring in the case where a spring-mass effect is assumed. The soft layer 11 may be a felt, a resin foam or the like. Examples of the felt include a felt manufactured using a polyester fiber, a polyamide fiber, an acrylic fiber or the like. The preferred is a felt of a polyester fiber. Additionally, examples of the resin foam include a resin foam manufactured using a polyurethane resin, a polyolefin resin or the like. The preferred is a resin foam of a polyurethane resin.

In the case where the soft layer comprises a felt, the density of the felt is not limited in particular. The density thereof is preferably in the range from 0.03 to 0.20 g/cm$^3$, and more preferably from 0.05 to 0.15 g/cm$^3$. In addition, the air permeability is not also particularly limited, but the air permeability measured by JIS L 1096 8.27.1 [Method A (Frazier method)] is preferably in the range from 180 to 4,200 cc/cm$^2$ per second, and more preferably from 1,400 to 3,900 cc/cm$^2$ per second. Further, in the case where the soft layer comprises a resin foam, the density of the resin foam is not limited in particular. The density measured by JIS K 6400 (1997) is preferably in the range from 30 to 200 kg/m$^3$, and more preferably from 50 to 150 kg/m$^3$. The air permeability is not also particularly limited, but the air permeability measured by the method described above is preferably in the range from 180 to 4,200 cc/cm$^2$ per second, and more preferably from 1,400 to 3,900 cc/cm$^2$ per second.

The hard layer has higher density compared to the soft layer and low air permeability or substantially no air permeability. That is, the hard layer corresponds to a mass in the case where the spring-mass effect is assumed. The hard layer may be a sheet formed of an EPDM, a polyvinyl chloride or the like that has substantially no air permeability.

Additionally, the hard layer may be a felt, a resin foam or the like of a material similar to that of the soft. In the case where the hard layer comprises a felt, the density of the felt is not limited in particular. The density thereof is preferably in the range from 0.05 to 0.30 g/cm$^3$, and more preferably from 0.10 to 0.20 g/cm$^3$. The air permeability is not also particularly limited, but the air permeability measured by the method described above is preferably in the range from 0 to 10 cc/cm$^2$ per second, and more preferably from 0 to 5 cc/cm$^2$ per second. In the case where the hard layer comprises a resin foam, the density of the resin foam is not particularly limited, but the density measured by the method described above is preferably in the range from 50 to 300 kg/m$^3$, and more preferably from 100 to 200 kg/m$^3$. The air permeability is not also particularly limited, but the air permeability measured by the method described above is preferably in the range from 0 to 10 cc/cm$^2$ per second, and more preferably from 0 to 5 cc/cm$^2$ per second.

The respective dimensions of the soft layer and the hard layer are not particularly limited. The respective dimensions of the soft layer and the hard layer in the planar direction are preferably such that respective side surfaces of the soft layer and the hard layer and the side surface of the wall body are distant from each other by preferably from 0.1 to 2 mm, and more preferably from 0.3 to 1 mm. Further, the thickness of the soft layer 11 is preferably such that an upper end surface (see upper end surface 111a in FIG. 3) on the first surface side 111 of the soft layer 11 is at an equivalent height as the wall body 312 or is lower than an upper end surface of the wall body 312 by preferably 1 mm or less, and more preferably 0.5 mm or less (see FIG. 3 in which the upper end surface 111a on the first surface side 111 of the soft layer 11 is lower than the upper end surface of the wall body 312 by the thickness of the hard layer 12). The thickness of the hard layer is preferably in the range from 0.5 to 8 mm, and more preferably from 1 to 5 mm. In addition, in the case where the hard layer comprises a material having higher density such as a rubber sheet, the thickness of the hard layer is preferably in the range from 0.5 to 3 mm, and more preferably from 1 to 2 mm in terms of a sound isolating performance of the hard layer and weight reduction of the soundproofing material.

The method of laminating the soft layer and the hard layer is not limited in particular. In the case where the soft layer and the hard layer can be bonded by thermal fusion bonding, at least one layer is subjected to heating to be softened or melted and then to heat pressing for bonding. Further, at least one layer is subjected to heating to be softened or melted and then to cold pressing for bonding. In the case where the thermal fusion bonding is not possible, joining and laminating can be performed using an appropriate adhesive according to the respective materials of the soft layer and the hard layer.

In the soundproofing material (see soundproofing material 104 in FIG. 8) according to the first embodiment of the present invention, the periphery on the second surface side of the soft layer 11 is joined to the wall body 312, and is fixed to the frame body 31 by a joint portion 22 (see FIG. 8) in the soundproofing laminate 1. In the first embodiment of a soundproofing material according to the present invention, the frame body 31 is consisting of the wall body 312, and the laminate accommodating portion is open as a through hole on both surfaces in the thickness direction of the soundproofing material (see opening portion 31b in FIG. 8). Therefore, the frame body 31 preferably has the wall body 312 which is made narrower in width from the second surface side of the soft layer 11 toward the hard layer 12 side. In the frame body 31 described above, the width of the laminate accommodating portion is made narrower from the hard layer 12 side toward the second surface side of the soft layer 11. Thus, the soundproofing laminate 1 can be stably fixed by the joint portion (see joint portion 22 in FIG. 8) even without a bottom surface (planar portion) for supporting the soundproofing laminate 1.

In the soundproofing material (see soundproofing materials 100 to 103 in FIG. 3 and FIGS. 5 to 7) according to the second embodiment of the present invention, the second surface side (see the second surface side 112 in FIG. 3) of the soft layer 11 is joined and fixed to at least one of the planar portion 311 and the wall body 312 of the frame body 31. That is, the entire surface on the second surface side 112 of the soft layer 11 may be joined to the planar portion 311 of the frame body 31 and fixed by a adhesion layer (see adhesion layer 21 in FIGS. 2, 3, 5, and 6), or the periphery on the second surface side 112 of the soft layer 11 may be joined to the planar portion 311 and/or the wall body 312 of the frame body 31 and fixed by the joint portion (see joint portion 22 in FIG. 7) in the soundproofing laminate 1.

The adhesive for joining the soundproofing laminate to the frame body is not limited in particular. The adhesive is preferably selected appropriately according to the respective materials of the soft layer and the frame body. Examples of the adhesive include a synthetic rubber adhesive and the like.

In the first and second embodiments of a soundproofing material according to the present, the side surface of the soundproofing laminate and the side surface of the wall body are distant from each other. Specifically, the respective side surfaces of the soft layer and the hard layer and the side surface of the wall body are distant from each other by preferably from 0.1 to 2 mm, and more preferably 0.3 to 1 mm, as described above. With such distances, the soundproofing laminate sufficiently vibrates when sound is propagates, thereby exhibiting an excellent soundproofing performance. In the case where the soundproofing laminate and the wall body make contact, the soundproofing laminate cannot vibrate, and thus a spring-mass function of converting sound into vibration and reducing the noise decreases, affecting the soundproofing performance.

In the case where the first and second embodiments of a soundproofing material according to the present are used as a soundproofing material for a vehicle, the hard layer 12 is arranged on a vehicle interior 202 side of a vehicle 200 (see FIGS. 1 and 2). In other words, the soft layer 11 is arranged on the sound source side (vehicle body panel 204 side) for use. Applications in this manner allow the noise from the sound source to be absorbed by the soft layer 11 and be further isolated by the hard layer 12 to sufficiently reduce the noise reaching an occupant in the vehicle interior 202.

The soundproofing material of the present invention can be used for products in a wide variety of fields including vehicles such as an automobile including cars and buses, and a rail vehicle including electric trains and railway trains; airplanes; vessels; constructions, and the like. It is particularly useful as a soundproofing material for an automobile and it can be attached to a pillar, a roof side rail and the like for use or may be used as a dash silencer, floor silencer or the like. In the case of being attached to the pillar, roof side rail or the like, the soundproofing material can function as an energy absorbing material and provide an excellent soundproofing performance.

EXAMPLE

Example 1

A dash silencer for an automobile was manufactured as a soundproofing material.

[1] Frame Body

A polypropylene resin was subjected to injection molding to produce a frame body with a planar portion having a thickness of 1 mm and a wall body that was installed upright on one surface side of the planar portion and had a height of 50 mm and a width of 1 mm. The frame body has a lattice sectional shape in the planar direction including a number of laminate accommodating portions in which one side is 50 mm, and is provided with a through hole at a predetermined position for inserting various members such as a steering shaft.

[2] Soundproofing Laminate

A felt prepared using polyethylene terephthalate fiber was used as a soft layer. The felt had a weight amount of 500 g/m$^2$, a thickness of 10 mm (a density of 0.05 g/cm$^3$), and an air permeability of 2,500 cc/cm$^2$ per second. A rubber sheet consisting of an EPDM and having a thickness of 1 mm was used as a hard layer. The rubber sheet had a density of 0.17 g/cm$^3$ and an air permeability of 0 cc/cm$^2$ per second. The felt and the rubber sheet were joined with an adhesive, and then the laminated sheet was cut for a soundproofing laminate in which one side is 48 mm.

[3] Soundproofing Material

The soundproofing laminate described above in [2] was applied with a synthetic rubber adhesive on a surface of the soft layer, and was arranged to be located in a center position in the planar direction of the laminate accommodating portion of the frame body described above in [1]. The soundproofing laminate was joined to the planar portion of the frame body to manufacture the soundproofing material (see FIG. 3). In this soundproofing material, the distance between the side surface of the soundproofing laminate and the side surface of the wall body was 1 mm.

The invention claimed is:

1. A soundproofing material which is used for soundproofing in a vehicle comprising:
   a frame body; and
   a soundproofing laminate accommodated in a laminate accommodating portion surrounded by a wall body forming said frame body,
   wherein said soundproofing laminate includes a hard layer and a soft layer in which one side of said soft layer is laminated on said hard layer,
   wherein a periphery of another side of said soft layer is joined to said wall body,
   wherein a side surface of said soundproofing laminate and a side surface of said wall body are distant from each other,
   wherein said hard layer is arranged on a vehicle interior side, and
   wherein said soft layer is one of a felt and a resin foam.

2. The soundproofing material according to claim 1, wherein said wall body is provided up to at least a height of an upper end surface on said one side of said soft layer.

3. The soundproofing material according to claim 2, wherein a planar shape of said frame body is a lattice shape.

4. The soundproofing material according to claim 1, wherein a planar shape of said frame body is a lattice shape.

5. The soundproofing material according to claim 1, wherein said hard layer is a sheet formed of an ethylene propylene diene rubber.

6. A soundproofing material which is used for soundproofing in a vehicle comprising:
   a frame body including a planar portion and a wall body installed upright on said planar portion; and
   a soundproofing laminate accommodated in a laminate accommodating portion surrounded by said wall body,
   wherein said soundproofing laminate includes a hard layer and a soft layer in which one side of said soft layer is laminated on said hard layer,
   wherein another side of said soft layer is joined to at least one of said planar portion and said wall body of said frame body,
   wherein a side surface of said soundproofing laminate and a side surface of said wall body are distant from each other,
   wherein said hard layer is arranged on a vehicle interior side, and
   wherein said soft layer is one of a felt and a resin foam.

7. The soundproofing material according to claim 6, wherein said wall body is provided up to at least a height of an upper end surface on said one side of said soft layer.

8. The soundproofing material according to claim 7, wherein a planar shape of said frame body is a lattice shape.

9. The soundproofing material according to claim 6, wherein a planar shape of said frame body is a lattice shape.

10. The soundproofing material according to claim 6, wherein said hard layer is a sheet formed of an ethylene propylene diene rubber.

* * * * *